(12) United States Patent
Staley, III et al.

(10) Patent No.: US 9,229,216 B2
(45) Date of Patent: Jan. 5, 2016

(54) SYSTEMS AND METHODS FOR PROTECTION OF EYEPIECE DISPLAYS

(75) Inventors: John R. Staley, III, Dallas, TX (US); James M. Florence, Dallas, TX (US)

(73) Assignee: RAYTHEON COMPANY, Waltham, MA (US)

( * ) Notice: Subject to any disclaimer, the term of this patent is extended or adjusted under 35 U.S.C. 154(b) by 951 days.

(21) Appl. No.: 13/435,736

(22) Filed: Mar. 30, 2012

(65) Prior Publication Data

US 2012/0249898 A1  Oct. 4, 2012

Related U.S. Application Data

(60) Provisional application No. 61/470,270, filed on Mar. 31, 2011.

(51) Int. Cl.
| | |
|---|---|
| *G02F 1/19* | (2006.01) |
| *G02B 23/14* | (2006.01) |
| *G02F 1/1335* | (2006.01) |
| *F41G 1/38* | (2006.01) |
| *G02B 25/00* | (2006.01) |
| *G03B 13/02* | (2006.01) |
| *G03B 11/04* | (2006.01) |

(52) U.S. Cl.
CPC ................ *G02B 23/14* (2013.01); *F41G 1/383* (2013.01); *G02B 25/00* (2013.01); *G02F 1/133553* (2013.01); *G02F 1/19* (2013.01); *G03B 11/046* (2013.01); *G03B 13/02* (2013.01)

(58) Field of Classification Search
None
See application file for complete search history.

(56) References Cited

U.S. PATENT DOCUMENTS

| | | | | |
|---|---|---|---|---|
| 4,961,625 | A | * 10/1990 | Wood et al. | ............ 359/630 |
| 2009/0114821 | A1 | 5/2009 | Gamroth et al. | |

FOREIGN PATENT DOCUMENTS

| | | |
|---|---|---|
| EP | 1152283 B1 | 8/2005 |
| JP | 63020243 A | 1/1988 |
| JP | 2003237411 A | 8/2003 |

* cited by examiner

*Primary Examiner* — Stephone B Allen
*Assistant Examiner* — James McGee
(74) *Attorney, Agent, or Firm* — Lando & Anastasi, LLP

(57) ABSTRACT

An electronic eyepiece includes a digital microdisplay and an electrically switchable light blocking mechanism configured to selectively transmit or block light transmitted along an optical path toward the digital microdisplay to protect the microdisplay from the risk of light focus damage. Further, a method of protecting a digital microdisplay of an electronic eyepiece from light focus damage includes determining a risk of light focus damage, and selectively opening or closing an optical path to the digital microdisplay responsive to the risk of light focus damage exceeding a predetermined risk threshold.

15 Claims, 4 Drawing Sheets

SYSTEMS AND METHODS FOR PROTECTION OF EYEPIECE DISPLAYS

CROSS REFERENCE TO RELATED APPLICATIONS

This application claims the benefit under 35 U.S.C. §119 (e) of U.S. Provisional Patent Application No. 61/470,270 filed on Mar. 31, 2011 and titled "Systems and Methods for Active Protection for Eyepiece Displays," which is incorporated herein by reference in its entirety.

BACKGROUND

Traditionally, weapon sights, such as rifle sights for example, have been based on direct view glass optics. Digital weapon sights are available, but may suffer from disadvantages that discourage their widespread use. For example, digital electronic sights may require the use of eyecups to protect the digital display from solar damage; however, the eyecup can restrict shooting position or peripheral vision. On small arms weapons, the use of an eyecup restricts a user from making larger adjustments to their eye relief and or cheek weld while in-combat. In contrast, the eyepieces of traditional glass and metal sights do allow a shooter to adjust their eye relief over a substantially greater range than an eyecup allows for. Also, displays for electronic sights may be more prone to inadvertent damage, including solar damage, in the field which may cause a loss of the sight image and threaten soldier survival.

SUMMARY OF THE INVENTION

Aspects and embodiments are directed to methods and apparatus for protecting an eyepiece of an electronic sight or other device from solar damage without the need for an eyecup. According to one embodiment, an electronic eyepiece includes a digital microdisplay eyepiece having a mechanism for opening and closing the viewing optical path to the microdisplay. The eyepiece may include a light blocking mechanism that actively protects the microdisplay from the risk of focused light damage, and which may default to a light blocking positioned when power to the eyepiece is lost or removed, as discussed in detail below. Embodiments of the eyepiece and display-protection mechanism and methods discussed herein may be used in a variety of sighting devices, including, for example, electronic rifle sights and military electronic rifle sights such as thermal weapon sights.

According to one embodiment, an electronic eyepiece comprises a digital microdisplay, and an electrically switchable light blocking mechanism configured to selectively transmit or block light transmitted along an optical path toward the digital microdisplay.

In one example, the electrically switchable light blocking mechanism includes an electrically switchable mirror. In another example, the eyepiece further comprises an eyepiece optic positioned in the optical path and configured to focus an image displayed by the digital microdisplay. The eyepiece optic may include a pair of lenses, and the electrically switchable mirror may be positioned between the pair of lenses. In one example, the electrically switchable mirror is a liquid crystal mirror configured to transform to a transmissive state in which the liquid crystal mirror transmits the light responsive to application of a control signal. The electronic eyepiece may further comprise a light detector having a field of view matching a field of view of the eyepiece and configured to provide a first signal indicative of a brightness of light entering the eyepiece. In one example the light detector is coupled to the electrical switchable light blocking mechanism, and the electrically switchable light blocking mechanism is configured to selectively transmit or block the light transmitted along an optical path toward the digital microdisplay responsive to the first signal. The electronic eyepiece may further comprise a controller coupled to electrically switchable light blocking mechanism and to the light detector. The controller may be configured to receive the first signal, based on the first signal, determine whether a risk of damage to the microdisplay from the light transmitted along the optical path toward the digital microdisplay exceeds a predetermined risk threshold, and responsive to determining that the predetermined risk threshold is exceeded, to provide a control signal to the electrically switchable light blocking mechanism to control the electrically switchable light blocking mechanism to block the light transmitted along the optical path toward the digital microdisplay. In one example the electronic eyepiece further comprises a use sensor configured to provide a second signal indicative of likely use or disuse of the electronic eyepiece. The use sensor may include a proximity sensor configured to detect a presence of a user of the electronic eyepiece and to provide the second signal responsive to detection of the presence of the user. In one example the use sensor is coupled to the controller and configured to provide the second signal to the controller, and the controller is further configured to adjust the predetermined risk threshold responsive to the second signal. In another example the electrically switchable light blocking mechanism includes an opaque stop into the optical path to block the light and out of the optical path to transmit the light.

According to another embodiment a method of protecting a digital microdisplay of an electronic eyepiece from light focus damage comprises determining a risk of light focus damage, and selectively opening or closing an optical path to the digital microdisplay responsive to the risk of light focus damage exceeding a predetermined risk threshold.

In one example of the method selectively opening or closing the optical path includes electrically switching a light blocking mechanism provided in the optical path between a transmitting state in which the optical path is open and a blocking state in which the optical path is closed. Electrically switching the light blocking mechanism may include electrically switching a mirror between a transmissive state and a reflecting state, for example. In one example determining the risk of light focus damage includes detecting light entering the eyepiece. In another example the method further comprises determining a likely use or disuse of the electronic eyepiece, and adjusting the predetermined risk threshold based on the likely use or disuse of the electronic eyepiece. In one example selectively opening or closing the optical path includes selectively switching an opaque stop into the optical path to close the optical path and out of the optical path to open the optical path. In another example selectively opening or closing the optical path includes selectively opening or closing a mechanical shutter positioned in the optical path.

Another embodiment is directed to a method of protecting a digital device, such as a microdisplay of an electronic eyepiece or digital imaging detector, from light focus damage, the method comprising electronically controlling a mirror to selectively transmit or block light transmitted along an optical path toward the digital device.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
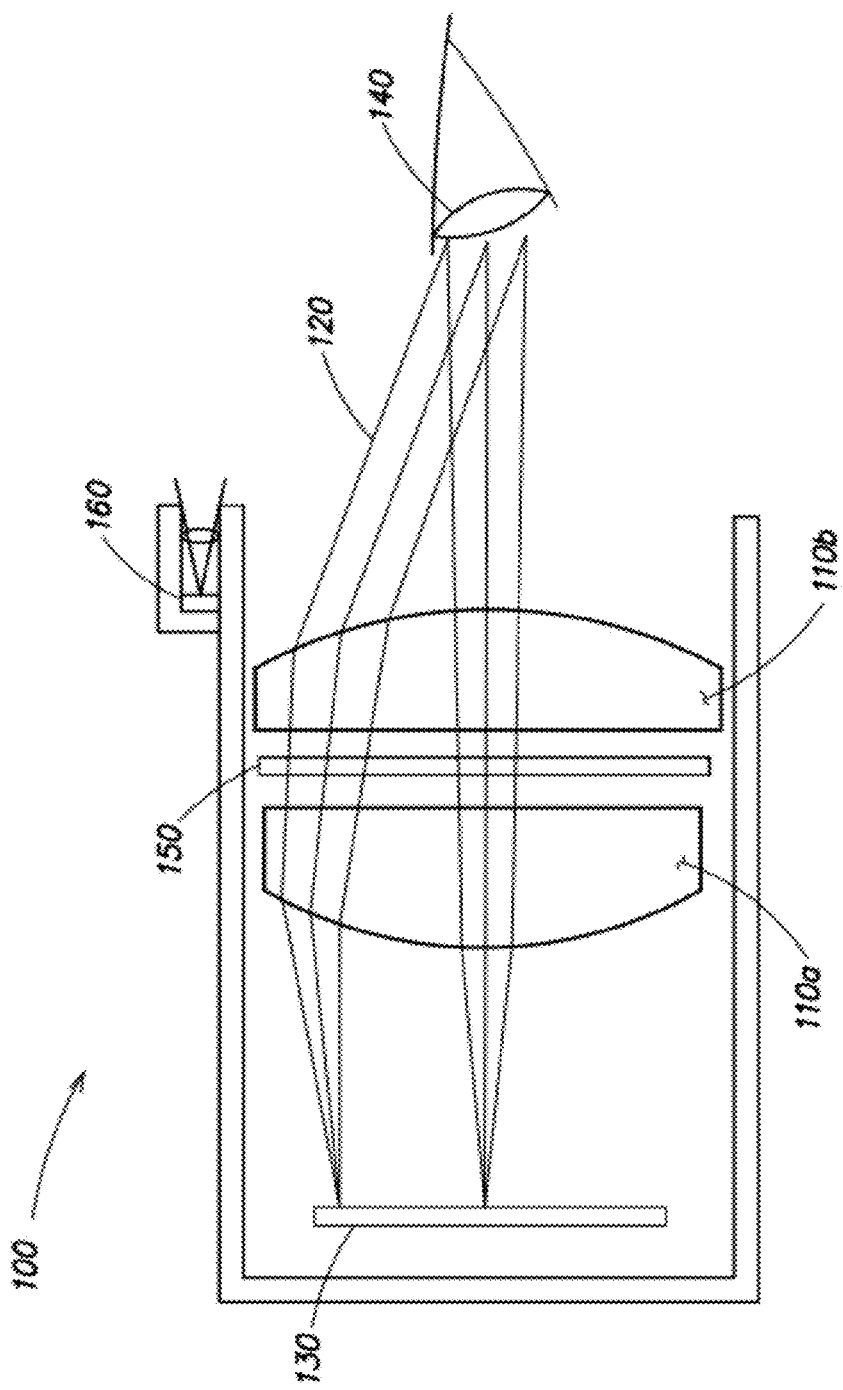
FIG. 1 is a block diagram of one example of an eyepiece including an electrically switchable mirror according to aspects of the invention.

Electronic (also referred to as digital) sights have eyepieces that allow the eye to see a microdisplay on which a camera image or other information is presented. Digital microdisplay eyepieces may be damaged when they are pointed at the sun. Conventionally, an eyecup is used between the eye and the eyepiece to block sunlight from washing out the user's view of the microdisplay and to protect the microdisplay from damage caused by focused sunlight burning the display. However, as discussed above, the eyecup may have several associated disadvantages. For example, eyecups do not allow the eye relief and peripheral vision freedom of a direct view rifle sight eyepiece. As a result, often users will remove the eyecup and later inadvertently allow the eyepiece to be pointed at the sun long enough for a focused image of the sun to burn the display and render a wide and wandering swath of pixels inoperable. Eyepiece solar damage is a barrier to adoption of digital rifle sights by military users.

Aspects and embodiments are directed to mechanisms suitable for use in a weapon sight, such as a rifle mounted sighting system, for example, which protect the display from solar damage without need of an eyecup, and without the fixed shooting position (cheekweld and eye relief) requirements of an eyecup. In one embodiment, eyepieces with microdisplay devices are protected from solar damage without restricting the eye's view through the eyepiece from any viewing position during use, and without degrading digital rifle sight use in combat. This may increase survival of microdisplay devices in eyepieces used in rifle sight applications. In one embodiment, an active mechanism is provided for protecting an eyepiece with a microdisplay from focused sunlight damage without resort to an eyecup. In another embodiment, an active mechanism is provided for detecting the presence or absence of sun focus (that is, the focus of sunlight through the eyepiece onto the microdisplay) to allow use of the eyepiece microdisplay without resort to an eyecup. In another embodiment, a passive mechanism is provided for preventing solar damage when power to the eyepiece is removed, again without resort to an eyecup or lens cap. Features of any of the embodiments disclosed herein may be used separately or together in a weapon sight.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

According to one embodiment, an actively and passively protected eyepiece is provided with an electronically switchable mirror operationally coupled with one or more sensors as mechanism of solar damage prevention. As discussed in more detail below, the sensors may be used to determine whether the eyepiece is in use, and/or whether solar damage is likely. The electronically switchable mirror may be controlled responsive to the sensors to change between a fully transmissive state in which light is allowed to pass to and from the microdisplay, and a reflecting state in which light is blocked from the microdisplay, as discussed further below.

Referring to FIG. 1 there is illustrated a block diagram of one example of an eyepiece 100 for a weapon sight or other sighting device. The eyepiece 100 includes a pair of lenses 110a, 110b that focus light 120 from a microdisplay 130 towards the eye 140 of a user. The lenses 110a, 110b, may similarly focus incoming light, such as sunlight, onto the microdisplay 130. In one embodiment, an electrically switchable light blocking mechanism 150 is positioned between the lenses 110a and 110b, as shown in FIG. 1. As discussed above, in one example, the light blocking mechanism 150 is a mirror which may be switched from fully reflecting to a fully transmitting state. In the fully reflecting state, the mirror may reflect incoming light 120 and thereby prevent the light from being focused onto the microdisplay 130. In this manner, the mirror may protect the microdisplay from damage due to focused sunlight or other bright light. The electronically controlled mirror may be compact, lightweight and easily inserted as an optic within an existing eyepiece optical design.

According to one embodiment, the light blocking mechanism 150 is switched between the light blocking state and the transmitting state by application of an electrical signal. In one example, the light blocking mechanism 150 is an electronically switched liquid crystal mirror. When the liquid crystal mirror is "deactivated," that is, when no signal (e.g., no voltage) is applied to the liquid crystal mirror, the mirror acts as a mirror and is in the reflecting state. When an electronic signal is applied, the liquid crystal mirror becomes clear, allowing light to pass to and from the display 130. In one embodiment, the electronically switchable mirror is constructed of a sandwich combination of coatings and a electrically responsive liquid crystal material layer which is electrically switched between a reflecting state, through a continuum of partially reflecting states and partially transmitting states, to a fully transmitting state.

In another example, the light blocking mechanism 150 is constructed using an actively switchable electro-chromic material. The light blocking mechanism 150 may be entirely constructed from an electro-chromic material, or may include one or more layers of an electro-chromic material on a clear (or transmissive) substrate. The electro-chromic material can be used electrically switched between an absorbing state and a transmitting state. In one example, the material may include a continuum of partial transmission states lying between the extremes. In another example, the light blocking mechanism is implemented using a photo-chromic material (such as eye glasses that lighten indoors and darken outdoors in bright sun) that alters its transmissions state in response to the amount of light impinging on the material. In one example, the use of a photo-chromic material in the light blocking mechanism 150 may be considered a passive solution, since the photo-chromic material may be directly controlled by a light signal, for example, the amount of light that the material is exposed to. In other examples, as discussed further below, the photo-chromic material may be actively controlled by electronic signals from one or more sensors that detect conditions that indicate whether the optical path to and from the microdisplay 130 should be open or closed.

In one embodiment, the light blocking mechanism 150 is actively controlled responsive to a sensor 160 that detects when the sun (or another bright light source) is within the field of view of the eyepiece 100 and could cause damage to the microdisplay 130. For example, the sensor 160 may include one or more light detectors optically arranged with a field of view (FOV) matching the field of view of the eyepiece 100 that may be used to detect whether there is a risk that the display may be burned or otherwise damaged by focused incoming light. The light detector(s) may be threshold detectors, or may be coupled to electronic threshold detection circuitry, configured to provide a control signal responsive to the detected light exceeding a predetermined threshold. The threshold may be selected based on knowledge of the light levels likely to cause damage to the microdisplay 130. The control signal may be used to electrically switch the light blocking mechanism 150 into the reflecting/opaque/absorbing state, thereby blocking light to the microdisplay 130 and preventing possible damage thereto. Thus, the combination of the sensor 160 and electrically switchable light blocking mechanism 150 may provide a solution by which to detect the presence of excess risk of focused light damage as a condition for opening or closing an optical path to viewing the microdisplay 130 in the eyepiece 100. Whenever excess light within the field of view of the eyepiece 100 is absent, the optical path to the microdisplay 130 in the eyepiece may be opened. Whenever the presence of excess risk of focused light damage is detected, the optical path to the microdisplay 130 in the eyepiece 100 is closed (or sufficiently closed to eliminate the risk of excess light).

As discussed above, in some examples, the light blocking mechanism 150 may be a mirror or other device constructed using a photo-chromic material. In one example, the transmission state of the photo-chromic material is controlled by the light impinging on the material, as discussed above. In this example, the photo-chromic material may act as both the sensor 160 and the light blocking mechanism 150 (e.g., mirror, absorber, shutter, or other device). As discussed further below, in some embodiments the light blocking mechanism 150 includes the electrically switched mirror that reverts to a mirror state when power to the eyepiece is off so that the microdisplay 130 remains protected. The photo-chromic material may be controlled by the light entering the eyepiece, and therefore may not use electrical power; instead, the energy from the light itself is used to protect the display 130 whenever there is excess light entering the eyepiece. The use of a photo-chromic material may thus provide an active and/or passive method of protection for the display 130 in the eyepiece.

It may be preferable that the method(s) of detecting risk of damage to the microdisplay 130, and responding to this risk, strike an operationally effective balance between complexity, weight, power, acceptable risk and false alarms that block the user's view of the display during tactical operations. In one embodiment, a mechanism is provided for detecting likely use or disuse of the eyepiece 100 and, responsive thereto, modifying the threshold for opening and closing the optical path to the microdisplay in the eyepiece. For example, whenever likely use of the eyepiece 100 is detected, the threshold for the risk of focused light damage that is used to close the optical path to the microdisplay 130 may be raised in order to balance the risk of damage to the microdisplay against the risk of interrupting the user's use of the eyepiece which could potentially result in harm to the user. Conversely, if it is detected that the eyepiece 100 is likely not in use, the threshold for the risk of focused light damage may be lowered to increase protection of the microdisplay 130.

Figure 2:
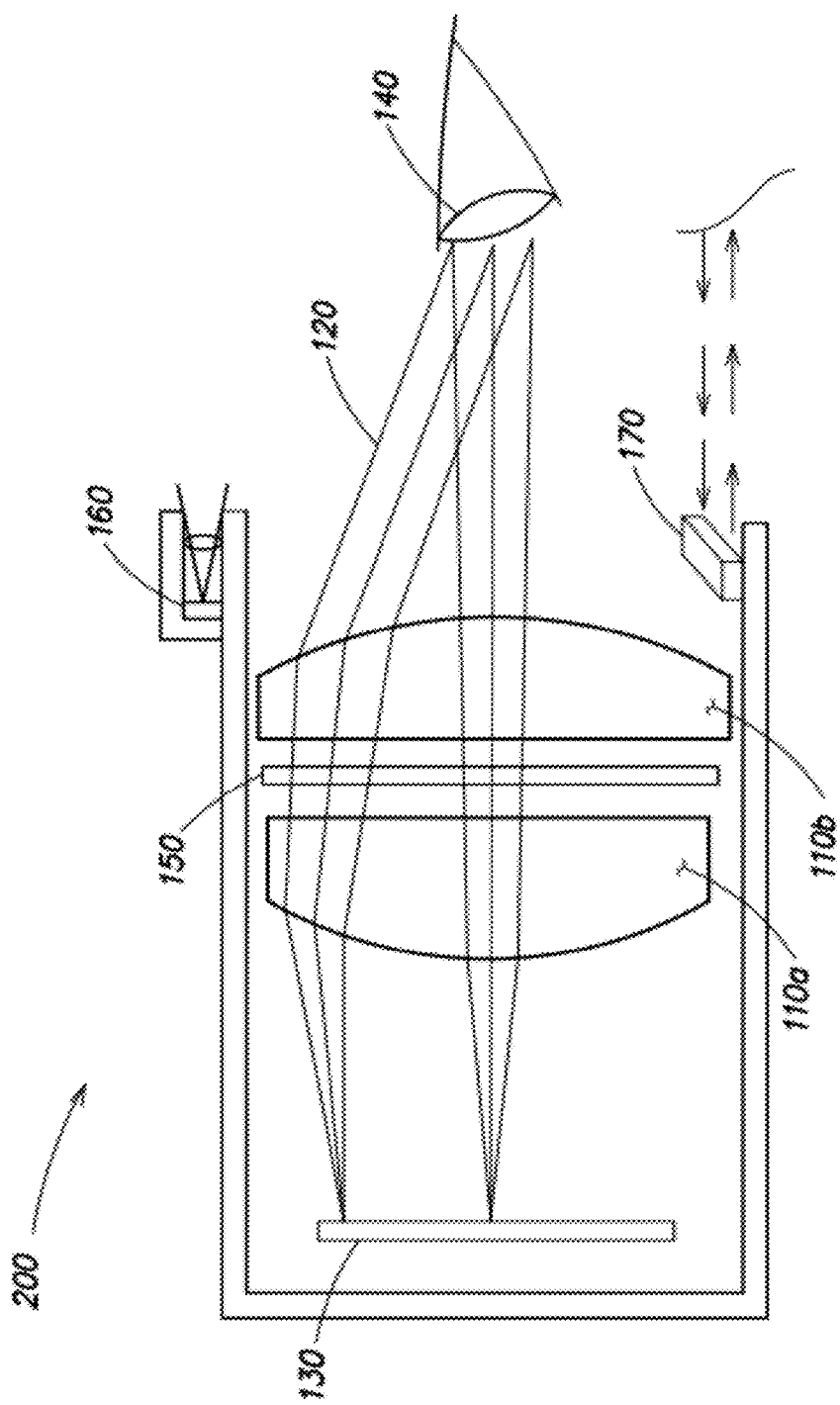
FIG. 2 is a block diagram of another example of an eyepiece including an electrically switchable mirror according to aspects of the invention.

Referring to FIG. 2, in one embodiment an eyepiece 200 includes a sensor 170 for detecting whether the user is looking through the sight or the sight is likely in use. In one example, the sensor 170 includes a proximity detector. For example, the sensor 170 may include an optical presence/absence sensor assembly comprised of a near-infrared emitter and a light detector optimized for a 1-8 inch detection distance. The eyepiece display 130 may remain blocked until the user is in useful proximity to the eyepiece 200. In some embodiments, a combination of the information from sensors 160 and 170 may be used to control the mirror 150 and open or close the optical path to and from the microdisplay 130. For example, optical path may remain closed while the user is not detected as being in useful proximity to the eyepiece 200 (as detected by sensor 170) and for so long as the eyepiece is not oriented such that bright light (e.g., from the sun) is within the field of view of the microdisplay (as detected by sensor 160). In some embodiments, the sight that includes the eyepiece 200 may be mounted to a weapon (such as a rifle, for example) and the eyepiece may be configured to be moved between an "in-use" position and a stowed position. Accordingly, the sensor 170 may include a device or electronics for detecting whether the eyepiece is in the "in-use" or stowed position, which may indicate whether the eyepiece is likely in use or not, and controlling the light blocking 150 or adjusting the risk threshold in response thereto.

According to another embodiment, the light blocking mechanism 150 includes an electrically switchable mirror that is configured such that in a "power off" state of the eyepiece 100/200, the mirror is fully reflecting and blocks light from damaging the microdisplay 130. Thus, when power to the eyepiece 100/200 is removed or lost, and default state of the mirror is such that the optical path to the microdisplay 130 is blocked and the mirror protects the display. Similarly, in embodiments where the light blocking mechanism includes a device other than a mirror, such as any of the various examples discussed above, the device may be configured to default to the light blocking position or state when power to the eyepiece is off. This configuration may provide a passive mechanism for protecting the microdisplay 130 when the eyepiece 100/200 is without power.

Thus, aspects and embodiments may provide both active and passive protection of the microdisplay in the eyepiece of an electronic sight without resort to an eyecup or lens cap. The electrically switchable light blocking 150 may be configured to block light transmission both when the sun (or another bright light source) is being imaged onto the display and when power to the sight is off, thereby reducing the risk of focused light damage by blocking light from reaching the display. For example, the light blocking mechanism 150 may be activated (i.e., made clear or transmissive) when the user's eye is in proximity of the eyepiece, or when there is no indication that there is enough sunlight entering the eyepiece to damage the display. If the user moves away from the eyepiece or if sufficient light flux entering the eyepiece from the sun is detected, the electronic signal driving the mirror (or other device) may be switched off and the mirror becomes reflective, preventing the damage to the display.

Figure 3:
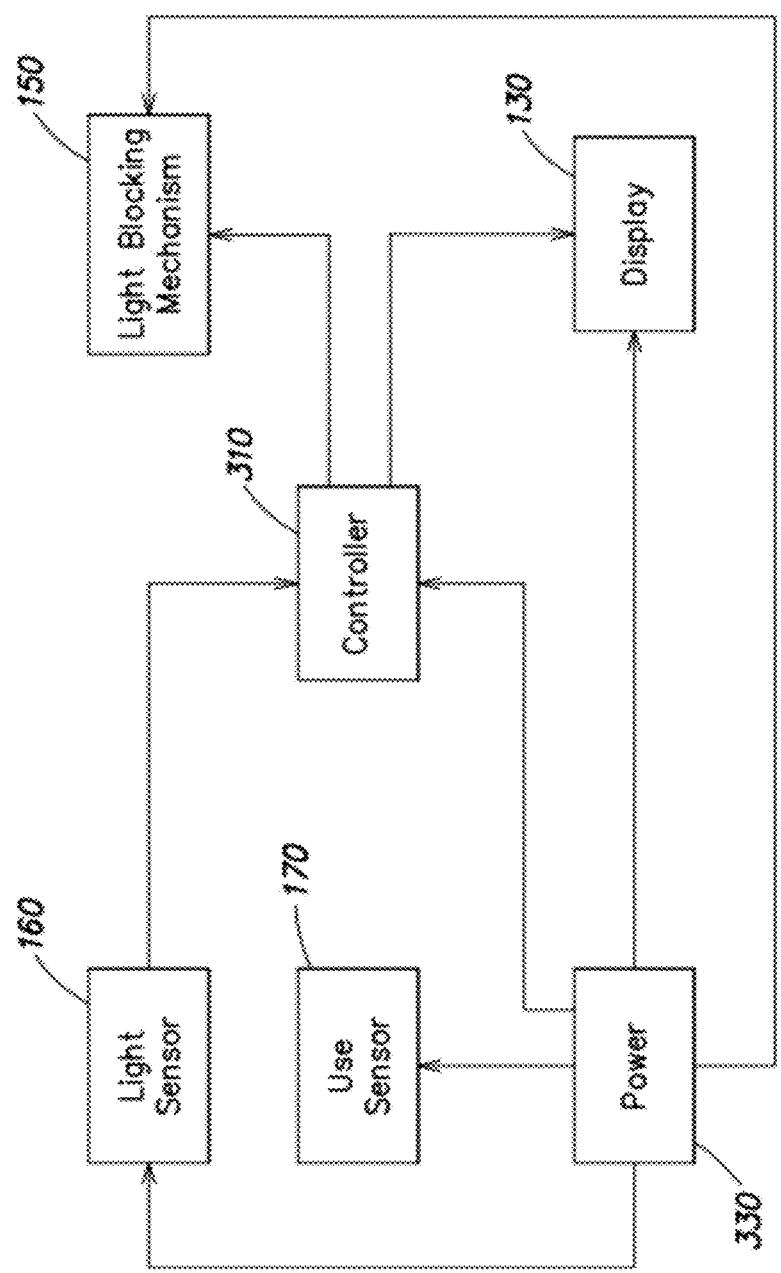
FIG. 3 is a block diagram of an example of a portion of a digital sight according to aspects of the invention.

Referring to FIG. 3, the eyepiece 100/200 may include, or may be coupled to, a controller 310 (such as a microprocessor, for example) that receives the signals from the sensor(s) 160 and/or 170 and adjusts the threshold for acceptable risk of light focus damage based upon the detection of likely use or disuse of the eyepiece and the presence or absence of excessive light within the field of view of the display, as discussed above. The controller 310 may supply a control signal to the light blocking mechanism 150 (e.g., the electrically switchable mirror discussed above) to control opening and closing of the optical path to the microdisplay 130. Power to the various components of the eyepiece 100/200 may be supplied by a power supply 330, which may be a battery pack or other power source. In one embodiment, the controller 310 (or another control mechanism within the sight) may be configured to place the sight in a power managing "sleep" state. The light blocking mechanism 150 may be configured to close the optical path to the microdisplay when the sight is in the power managing sleep state.

As discussed above, in some embodiments the light blocking mechanism 150 is an electrically controlled mirror. However, in alternative embodiments, an electrically controlled light blocking iris, flag or other shutter mechanism may be used. For example, in some embodiments, the light blocking mechanism includes a mirror, such as a liquid crystal mirror, that is reflecting in the deactivated (light blocking) state. However, in other embodiments, the light blocking mechanism is opaque in the light blocking state, but need not be reflective. For example, the light blocking mechanism may be a liquid crystal device that is transmissive when a control signal is applied, and becomes opaque when the control signal is removed. In other examples, the light blocking mechanism may include an opaque physical stop or shutter which may be pivoted, rotated or otherwise moved into and out of the optical path (or opened and closed) responsive to an electronic control signal to selectively block light from reaching the display.

Furthermore, while FIGS. 1 and 2 illustrate one example of the eyepiece optic including the pair of lenses 110a, 110b being plano-convex lenses that are arranged in an opposing configuration, numerous other configurations of the eyepiece optic may be used in conjunction with the light blocking mechanism 150 and methods discussed herein. For example, one or both of the lenses 110a, 110b may have a shape other than plano-convex. The electrically switchable mirror, or other light blocking mechanism 150, need not be positioned between the two lenses 110a, 110b, as shown in FIGS. 1 and 2, but instead may be positioned on either side of the lens pair or in another location, provided only that the light blocking mechanism is capable of opening and closing the optical path to the microdisplay 130.

In addition, since in certain embodiments no eyecup is used with the eyepiece 100/200, it may be preferable to use a microdisplay 130 that is capable of providing a high contrast image visible over the widest possible range of lighting without need of an eyecup. As discussed above, separate from the issue of protecting the display from the sun, conventional electronic eyepieces need eyecups for viewing contrast. Accordingly, in one embodiment, the microdisplay 130 includes a high brightness, high resolution OLED (organic light emitting diode) display that allows for daytime viewing without eye shading. For example, the microdisplay 130 may include a high brightness monochromatic white or green OLED display. In another example, the microdisplay 130 includes a full color display. In other examples, the microdisplay 130 includes an LCD or OLED display, and may use either the SVGX or SVGA, or other resolution formats. Anti-reflection coatings on the eyepiece optics may be used to reduce sun glint from the eyepiece towards the user's eye box and maximize display image contrast.

In some instances or applications, an eyecup may still be necessary or desirable to maintain light security during night operations, and/or to provide sufficient contrast in extreme lighting conditions. For example, in embodiments in which the display 130 includes a full color display, an eyecup may be necessary for the purpose of visibility (contrast) in bright daylight situations. Accordingly, in another embodiment, a collapsible eyecup may be provided that can be extended to serve as a sunshield during bright light conditions, and which can be collapsed out of the way when not needed. Any of the various embodiments of light blocking mechanisms may be used in conjunction with the collapsible eyecup to protect the display 130 when the eyecup is collapsed.

Figure 4:
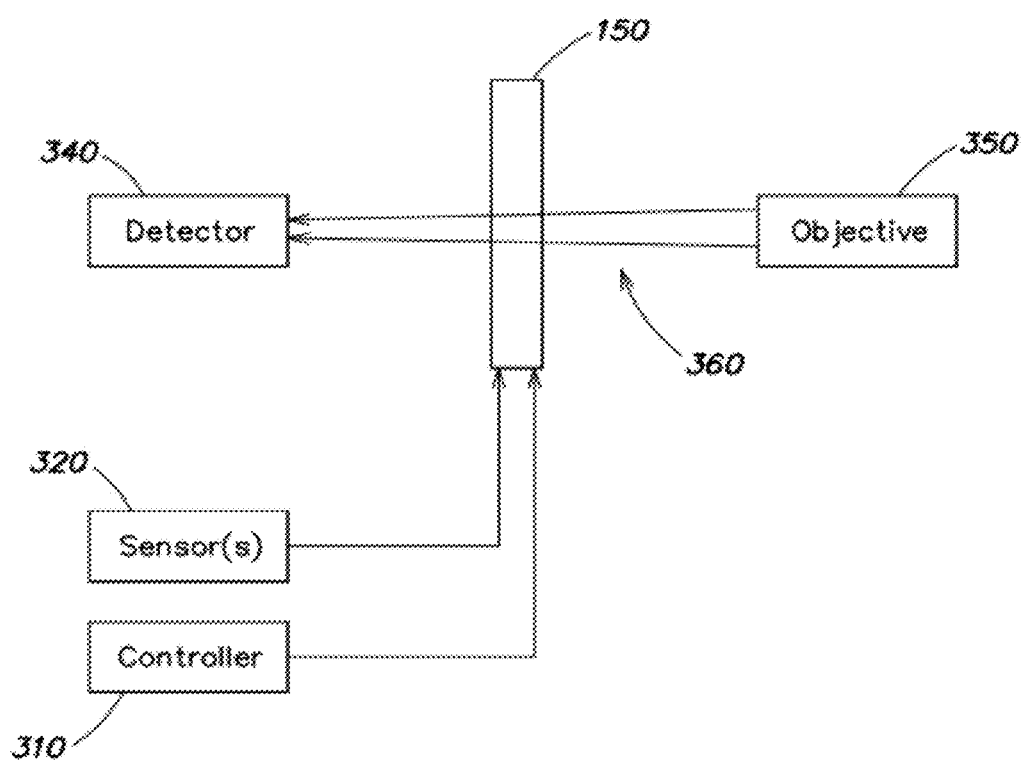
FIG. 4 is a block diagram of another example of an electronic system including a light blocking mechanism according to aspects of the invention.

Furthermore, although the above discussion refers primarily to the protection of an electronic microdisplay in an electronic eyepiece, embodiments of the light blocking mechanism may also be used to provide protection to other devices that may suffer thermal damage from focused sunlight or other bright light. For example, digital imaging devices include an imaging sensor or detector and an optical objective (including one or more mirrors or lenses) that focuses light onto the detector to allow the detector to produce an image of a scene. Such imaging detectors may be damaged if the objective focuses bright sunlight onto the imaging detector. Accordingly, referring to FIG. 4, in one example, an electronically switchable light blocking mechanism 150, as described above, may be provided between the imaging detector 340 and the objective 350 to selectively block or allow light 360 from the objective to be focused onto the detector. The light blocking mechanism 150 may be coupled to one or more sensors 320 (such as the sensors 160 and 170 discussed above) and/or to a controller 310 that selectively control the light blocking mechanism 150 to block or transmit the light 360 based on conditions such as risk of damage to the detector (due to the presence of excess light) and/or likelihood of the imaging system being in use, etc., as discussed above. Similarly, other devices (in addition to eyepieces or imaging detectors) may be protected from light focus damage using the various embodiments and examples of the light blocking mechanisms and control mechanisms discussed above. Furthermore, eyepieces or displays for systems other than electronic sights, such as an eyewear based computer screen that presents electronic information but is not part of a sighting system, for example, may similarly be protected from light focus damage using the light blocking mechanisms and control mechanisms discussed above.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An electronic eyepiece comprising:
   a digital microdisplay;
   an electrically switchable light blocking mechanism configured to selectively transmit or block light transmitted along an optical path toward the digital microdisplay;
   a light detector having a field of view matching a field of view of the eyepiece and configured to provide a first signal indicative of a brightness of light entering the eyepiece;
   a use sensor configured to provide a second signal indicative of likely use or disuse of the electronic eyepiece, the use sensor including a proximity sensor configured to detect a presence of a user of the electronic eyepiece and to provide the second signal responsive to detection of the presence of the user; and
   a controller coupled to the electrically switchable light blocking mechanism, to the use sensor, and to the light detector, the controller being configured to:
   receive the first and second signals,
   based on the first signal, determine whether a risk of damage to the microdisplay from the light transmitted along the optical path toward the digital microdisplay exceeds a predetermined risk threshold,
   adjust the predetermined risk threshold responsive to the second signal, and
   responsive to determining that the predetermined risk threshold is exceeded, to provide a control signal to the electrically switchable light blocking mechanism to control the electrically switchable light blocking mechanism to block the light transmitted along the optical path toward the digital microdisplay.

2. The electronic eyepiece of claim 1, wherein the electrically switchable light blocking mechanism includes an opaque stop movable into the optical path to block the light and out of the optical path to transmit the light.

3. The electronic eyepiece of claim 1, wherein the electrically switchable light blocking mechanism includes an electrically switchable mirror.

4. The electronic eyepiece of claim 3, wherein the electrically switchable mirror is a liquid crystal mirror configured to transform to a transmissive state in which the liquid crystal mirror transmits the light responsive to application of a control signal.

5. The electronic eyepiece of claim 3, wherein the eyepiece further comprises an eyepiece optic positioned in the optical path and configured to focus an image displayed by the digital microdisplay.

6. The electronic eyepiece of claim 5, wherein the eyepiece optic includes a pair of lenses, and wherein the electrically switchable mirror is positioned between the pair of lenses.

7. The electronic eyepiece of claim 1, wherein the light detector is coupled to the electrically switchable light blocking mechanism, and wherein the electrically switchable light blocking mechanism is configured to selectively transmit or block the light transmitted along an optical path toward the digital microdisplay responsive to the first signal.

8. A method of protecting a digital device from light focus damage, the method comprising:
   determining a risk of light focus damage;
   electronically controlling a mirror to selectively transmit or block light transmitted along an optical path toward the digital device responsive to the risk of light focus damage exceeding a predetermined risk threshold;
   determining a likely use or disuse of the digital device; and
   adjusting the predetermined risk threshold based on the likely use or disuse of the digital device.

9. A method of protecting a digital microdisplay of an electronic eyepiece from light focus damage, the method comprising:
   determining a risk of light focus damage;
   selectively opening or closing an optical path to the digital microdisplay responsive to the risk of light focus damage exceeding a predetermined risk threshold;
   determining a likely use or disuse of the electronic eyepiece; and
   adjusting the predetermined risk threshold based on the likely use or disuse of the electronic eyepiece.

10. The method of claim 9, wherein selectively opening or closing the optical path includes selectively opening or closing a mechanical shutter positioned in the optical path.

11. The method of claim 9, wherein selectively opening or closing the optical path includes selectively switching an opaque stop into the optical path to close the optical path and out of the optical path to open the optical path.

12. The method of claim 9, wherein selectively opening or closing the optical path includes electrically switching a light blocking mechanism provided in the optical path between a transmitting state in which the optical path is open and a blocking state in which the optical path is closed.

13. The method of claim 12, wherein electrically switching the light blocking mechanism includes electrically switching a mirror between a transmissive state and a reflecting state.

14. The method of claim 9, wherein determining the risk of light focus damage includes detecting light incident on the digital device.

15. The method of claim 9, wherein determining the risk of light focus damage includes detecting light entering the electronic eyepiece.

* * * * *